US009823482B2

(12) United States Patent
Muller et al.

(10) Patent No.: US 9,823,482 B2
(45) Date of Patent: Nov. 21, 2017

(54) AUTOSTEREOSCOPIC DISPLAYS

(71) Applicant: Universal Display Corporation, Ewing, NJ (US)

(72) Inventors: Richard A. Muller, Berkeley, CA (US); Neal I. Weinstock, Brooklyn, NY (US); Michael Hack, Princeton, NJ (US)

(73) Assignee: Universal Display Corporation, Ewing, NJ (US)

( * ) Notice: Subject to any disclaimer, the term of this patent is extended or adjusted under 35 U.S.C. 154(b) by 802 days.

(21) Appl. No.: 13/970,147

(22) Filed: Aug. 19, 2013

(65) Prior Publication Data

US 2015/0049266 A1 Feb. 19, 2015

(51) Int. Cl.
*G02B 27/22* (2006.01)
*H04N 1/04* (2006.01)
(Continued)

(52) U.S. Cl.
CPC ..... *G02B 27/2214* (2013.01); *H04N 13/0282* (2013.01); *H04N 1/0423* (2013.01)

(58) Field of Classification Search
CPC ............ G02B 27/2214; G02B 27/2228; G02B 27/2242; G02B 27/225; G02B 27/2264; G02B 27/22; H04N 13/0051; H04N 13/0282; H04N 13/0296; H04N 13/0402; H04N 13/0404; H04N 13/0443; H04N 13/0445; H04N 13/045; H04N 13/0497;
(Continued)

(56) References Cited

U.S. PATENT DOCUMENTS 4,769,292 A 9/1988 Tang
5,247,190 A 9/1993 Friend
(Continued)

FOREIGN PATENT DOCUMENTS

TW 201416708 A 5/2014
WO 2008057394 5/2008
(Continued)

OTHER PUBLICATIONS

Baldo, et al., "Highly Efficient Phosphorescent Emission fromOrganic Electroluminescent Devices," Nature, Sep. 10, 1998, 4 pages, Macmillan Publishers Ltd., London, UK
(Continued)

*Primary Examiner* — Michael Caley
*Assistant Examiner* — Angela Davison
(74) *Attorney, Agent, or Firm* — Morris & Kamlay LLP

(57) ABSTRACT

An autostereoscopic display system includes a display including a plurality of addressable pixels. Each of the plurality of pixels includes two or more sub-pixels. The display is adapted to have n views in the horizontal direction wherein n is an integer greater than or equal to 2. A native pixel density of the display in the horizontal direction divided by n is greater than 75% of a native pixel density in the vertical direction. The system further includes a view selector that, for each of two or more viewing perspectives, makes one of the views visible and a multiplexer system in operative connection with the display. The multiplexer system is adapted to controllably shift light horizontally from at least one of the plurality of pixels.

46 Claims, 12 Drawing Sheets

(51) Int. Cl.
*H04N 1/028* (2006.01)
*H04N 13/02* (2006.01)

(58) Field of Classification Search
CPC ......... H04N 2013/0096; H04N 1/0408; H04N 1/0412; H04N 1/0411; H04N 1/0414; H04N 1/0423
USPC .......... 349/15; 359/462, 463; 348/42, 54, 59
See application file for complete search history.

(56) References Cited

U.S. PATENT DOCUMENTS

| | | |
|---|---|---|
| 5,703,436 A | 12/1997 | Forrest |
| 5,707,745 A | 1/1998 | Forrest |
| 5,834,893 A | 11/1998 | Bulovic |
| 5,844,363 A | 12/1998 | Gu |
| 6,013,982 A | 1/2000 | Thompson |
| 6,087,196 A | 7/2000 | Sturm |
| 6,091,195 A | 7/2000 | Forrest |
| 6,097,147 A | 8/2000 | Baldo |
| 6,294,398 B1 | 9/2001 | Kim |
| 6,303,238 B1 | 10/2001 | Thompson |
| 6,337,102 B1 | 1/2002 | Forrest |
| 6,468,819 B1 | 10/2002 | Kim |
| 7,279,704 B2 | 10/2007 | Walters |
| 7,431,968 B1 | 10/2008 | Shtein |
| 7,968,146 B2 | 6/2011 | Wagner |
| 2003/0128175 A1 | 7/2003 | Berstis |
| 2003/0230980 A1 | 12/2003 | Forrest |
| 2004/0174116 A1 | 9/2004 | Lu |
| 2005/0264761 A1 | 12/2005 | Cobb |
| 2006/0170834 A1 | 8/2006 | Kim et al. |
| 2007/0086090 A1* | 4/2007 | Wang ................... G02B 27/225 359/464 |
| 2008/0252955 A1 | 10/2008 | Redert |
| 2008/0259233 A1 | 10/2008 | Krijn et al. |
| 2010/0259819 A1* | 10/2010 | Hiddink ............. G02B 27/2242 359/463 |
| 2011/0248294 A1* | 10/2011 | Weaver ................. H01L 25/048 257/89 |
| 2011/0310232 A1 | 12/2011 | Wilson et al. |
| 2012/0026161 A1 | 2/2012 | Chen et al. |
| 2012/0092339 A1 | 4/2012 | Pijlman et al. |
| 2012/0120121 A1* | 5/2012 | Yoshida ............. G02B 27/2214 345/690 |
| 2013/0093663 A1 | 4/2013 | Shikii et al. |
| 2013/0162919 A1 | 6/2013 | Wu et al. |
| 2014/0132863 A1 | 5/2014 | Chang |

FOREIGN PATENT DOCUMENTS

| | | |
|---|---|---|
| WO | WO-2009044334 A1 | 4/2009 |
| WO | 2010011390 | 1/2010 |

OTHER PUBLICATIONS

Baldo, et al., "Very high-efficiency green organic light-emitting devices based on electrophosphorescence," Applied Physics Letters, Jul. 5, 1999, 4 pages, vol. 75, No. 1, American Institute of Physics, Melville, NY, USA.

International Search Report for Application PCT/US2014/052504, dated Mar. 16, 2015, 6 pages, European Patent Office, The Hague, Netherlands.

* cited by examiner

AUTOSTEREOSCOPIC DISPLAYS

The claimed invention was made by, on behalf of, and/or in connection with one or more of the following parties to a joint university corporation research agreement: Regents of the University of Michigan, Princeton University, The University of Southern California, and the Universal Display Corporation. The agreement was in effect on and before the date the claimed invention was made, and the claimed invention was made as a result of activities undertaken within the scope of the agreement.

FIELD

In a number of embodiments, devices, systems and methods hereof relate generally to autostereoscopic displays, and, for example, to autostereoscopic displays with improved resolution and/or power consumption characteristics.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding the technologies or the background thereof. The disclosure of all references cited herein are incorporated by reference.

Conventional autostereoscopic displays use arrays of lenses or parallax barriers or other view selectors to make a number of pixels of the display visible to one eye of a viewing person and to make a number of other pixels of the display visible to the other eye of the viewing person. By isolating the pixels of the display visible to each eye, the two components of a stereoscopic image can be presented on the display.

Since an ordinary viewer's eyes are side-by-side and aligned horizontally, the array of lenses makes pixels visible according to horizontal orientation. As a result, corresponding pixels for the left and right eyes are located in the same scanline and displaced from one another horizontally.

In the case of an autostereoscopic display having only two views, each eye of the viewer therefore sees an image having a horizontal resolution that is halved. In autostereoscopic displays, field of view may be improved by having more than just two views. Multiple view lenticular systems have at least four and some have 9 or more views, resulting in a reduction in horizontal resolution as perceived by the viewing person to one-fourth, one-ninth, or less of the original resolution. At the same time, the vertical resolution of the image as perceived by the viewer remains unchanged, resulting in an unpleasant and noticeable imbalance in the horizontal and vertical resolutions of the displayed image.

Further, to provide greater perceived depths of projection, many more views (for example, 24 views) are required within a relatively narrow space (for example, 1 mm). A typical LCD display screen may, for example, have a pixel density of about 200 pixels per inch, though some have densities approaching 300 or even 500 pixels per inch, depending on application. Such a pixel density corresponds to approximately 6 pixels per millimeter (that is, about one quarter of the resolution required to provide 24 views in a 1 mm space) to 20 pixels per millimeter. In general, many conventional video display devices are incapable of providing enough views in a sufficiently small space to satisfy the demands of modern autostereoscopic images.

In addition to LCD- and LED-based displays, opto-electronic displays that make use of organic materials are becoming increasingly desirable for a number of reasons. Many of the materials used to make such devices are relatively inexpensive and are highly efficient, so organic opto-electronic devices have the potential for cost advantages and power and other performance advantages over inorganic devices such as LEDs and LCDs. In addition, the inherent properties of organic materials, such as their flexibility, may make them well suited for particular applications such as fabrication on a flexible substrate. Examples of organic opto-electronic devices include organic light emitting devices (OLEDs). For OLEDs, the organic materials may have performance advantages over conventional materials. For example, the wavelength at which an organic emissive layer emits light may generally be readily tuned with appropriate dopants.

OLEDs make use of thin organic films that emit light when voltage is applied across the device. OLEDs are becoming an increasingly interesting technology for use in applications such as flat panel displays, illumination, and backlighting. Several OLED materials and configurations are described in U.S. Pat. Nos. 5,844,363, 6,303,238, and 5,707,745, which are incorporated herein by reference in their entirety.

Phosphorescent emissive molecules are used in full color displays. Industry standards for such a display call for pixels adapted to emit particular colors, referred to as "saturated" colors. In particular, these standards call for saturated red, green, and blue pixels. Color may be measured using CIE coordinates, which are well known to the art.

One example of a green emissive molecule is tris(2-phenylpyridine) iridium, denoted Ir(ppy)$_3$, which has the following structure:

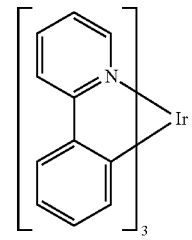

In this structure, we depict the dative bond from nitrogen to metal (here, Ir) as a straight line.

As used herein, the term "organic" includes polymeric materials as well as small molecule organic materials that may be used to fabricate organic opto-electronic devices. "Small molecule" refers to any organic material that is not a polymer, and "small molecules" may actually be quite large. Small molecules may include repeat units in some circumstances. For example, using a long chain alkyl group as a substituent does not remove a molecule from the "small molecule" class. Small molecules may also be incorporated into polymers, for example as a pendent group on a polymer backbone or as a part of the backbone. Small molecules may also serve as the core moiety of a dendrimer, which consists of a series of chemical shells built on the core moiety. The core moiety of a dendrimer may be a fluorescent or phosphorescent small molecule emitter. A dendrimer may be a "small molecule," and it is believed that all dendrimers currently used in the field of OLEDs are small molecules.

As used herein, "top" means furthest away from the substrate, while "bottom" means closest to the substrate. Where a first layer is described as "disposed over" a second layer, the first layer is disposed further away from substrate. There may be other layers between the first and second layer, unless it is specified that the first layer is "in contact with" the second layer. For example, a cathode may be described as "disposed over" an anode, even though there are various organic layers in between.

As used herein, "solution processible" means capable of being dissolved, dispersed, or transported in and/or deposited from a liquid medium, either in solution or suspension form.

More details on OLEDs, and the definitions described above, can be found in U.S. Pat. No. 7,279,704, which is incorporated herein by reference in its entirety.

BRIEF SUMMARY

In summary, in one aspect, an autostereoscopic display system includes a display including a plurality of addressable pixels. Each of the plurality of pixels includes two or more sub-pixels. The display is adapted to have n views in the horizontal direction wherein n is an integer greater than or equal to 2. A native pixel density of the display in the horizontal direction divided by n is greater than 75% a native pixel density in the vertical direction. The native pixel density of the display in the horizontal direction divided by n may also be greater than 80%, 85%, 90% or 95% the native pixel density in the vertical direction. In a number of embodiments, the native pixel density of the display in the horizontal direction divided by n is greater than or equal to the native pixel density in the vertical direction. The system further includes a view selector that, for each of two or more viewing perspectives, makes one of the views visible, and a multiplexer system in operative connection with the display. The multiplexer system is adapted to controllably shift light horizontally from at least one of the plurality of pixels. Typically, the multiplexer controllably shifts light horizontally from each of the pixels. The multiplexer system may, for example, be adapted to controllably shift light from each of the plurality of pixels as a function of time to provide at least twice the number of views as provided without the multiplexer system.

Each of the two or more sub-pixels of the plurality of pixels may, for example, include an organic light emitting device, a light emitting diode or a liquid crystal. The multiplexer system is optically coupled to the display and electrically synchronized with the display.

In a number of embodiments, the multiplexer system includes one or more lenses, each of which has a refractive index that is variable in response to an input signal thereto, the input signal being variable over time. The one or more lenses of the multiplexer system may, for example, include prisms. The prisms may, for example, include a liquid crystalline material having a refractive index that is variable in response to an electrical signal.

In a number of embodiments, the multiplexer system is adapted to controllably shift light from each of the plurality of pixels as a function of time to provide m times as many views as provided without the multiplexer system, wherein m is an integer of at least 2, and a fill factor of each sub-pixel is less than 1/m. The fill factor of each sub-pixel may, for example, be caused to be less than 1/m by masking (to block light emitted from a portion of the sub-pixel). The fill factor of each sub-pixel may, for example, be caused to be less than 1/m by limiting the size of an active area of the sub-pixel.

In a number of embodiments, a perceived pixel density of the display in the horizontal direction divided by n·m is greater than or equal to the pixel density in the vertical direction.

In a number of embodiments, the active area of each sub-pixel is formed via patterning sub-pixel layers to form an OLED device. At least one pixel may, for example, include a red sub-pixel, a green sub-pixel and a blue sub-pixel. When indicated that at least one pixel and/or other element hereof has a certain quality or aspect, a plurality of such pixels and/or other elements (including all such pixels and/or other elements) may have that certain quality or aspect, unless the context clearly dictates otherwise.

At least one pixel may, for example, include at least one white sub-pixel and at least one color filter. At least one pixel may, for example, include a first sub-pixel having an emissive region configured to emit blue light, a second sub-pixel having an emissive region configured to emit yellow light and two color filters. In a number of embodiments, at least one pixel includes a sub-pixel through which light blue light is emitted having a peak wavelength in the visible spectrum of 465-500 nm and a sub-pixel areas through which deep blue light is emitted having a peak wavelength in the visible spectrum of 400-465 nm.

The emissive region of at least one sub-pixel may, for example, be larger than an active area of the sub-pixel, and the active area may be defined by at least one electrode of the sub-pixel.

In a number of embodiments, the display is operable in an autostereoscopic mode and in a two-dimensional mode, and at least one of the sub-pixels includes a first active area for which the fill factor is less than 1/m and a second active area. Only the first active area emits light in the autostereoscopic mode. Both the first active area and the second active area emit light in the two-dimensional mode.

The view selector of the display may, for example, include a lens system. The view selector may, for example, include a lenticular lens system, a microlens array system or a parallax barrier system positioned over the display. In a number of embodiments, a focal length of lenses of the lenticular lens system or the microlens array system is greater than twice a width of the lenses of the lenticular lens system or the microlens array system, greater than five times a width of the lenses of the lenticular lens system or the microlens array system or greater than ten times a width of the lenses of the lenticular lens system or the microlens array system.

As described above, the multiplexer system may be adapted to controllably shift light from each the plurality of pixels as a function of time to provide m times as many views as provided without the multiplexer system. The multiplexer system may, for example, divide each native frame of the display into m sub-frames.

In another aspect, a method of providing an autostereoscopic, three-dimensional image includes providing a display including a plurality of addressable pixels, each of the plurality of pixels including two or more sub-pixels, the display being adapted to have n views in the horizontal direction, wherein n is an integer greater than or equal to 2, and wherein a native pixel density of the display in the horizontal direction divided by n is greater than 75% a native pixel density in the vertical direction; providing a view selector in operative connection with the display that, for each of two or more viewing perspectives, makes one of the views visible; and providing a multiplexer system in operative connection with the display. The native pixel density of the display in the horizontal direction divided by n may also be greater than 80%, 85%, 90% or 95% the native pixel density in the vertical direction. In a number of embodiments, the native pixel density of the display in the horizontal direction divided by n is greater than or equal to the native pixel density in the vertical direction. The multiplexer system is adapted to controllably shift light horizontally from at least one of the plurality of pixels.

In a further aspect, an autostereoscopic display system, which is operable in an autostereoscopic mode and in a two-dimensional mode, includes a display including a plurality of addressable pixels, each of the plurality of pixels comprising two or more sub-pixels, a view selector that, for each of two or more viewing perspectives, makes one of the views visible, and a multiplexer system in operative connection with the display. The multiplexer system is adapted to controllably shift light horizontally from at least one of the plurality of pixels as a function of time to provide m times as many views as provided without the multiplexer system, wherein m is an integer of at least 2. At least one of the sub-pixels includes a first active area for which the fill factor is less than 1/m and a second active area (different from the first active area). Only the first active area emits light in the autostereoscopic mode. Both the first active area and the second active area emit light in the two-dimensional mode.

In still a further aspect, a device, includes an autostereoscopic display system as described above. In a number of embodiments, a device hereof includes a display including a plurality of addressable pixels, each of the plurality of pixels includes two or more sub-pixels. The display is adapted to have n views in the horizontal direction, wherein n is an integer greater than or equal to 2. A native pixel density of the display in the horizontal direction divided by n is greater than 75% a native pixel density in the vertical direction. As described above, the native pixel density of the display in the horizontal direction divided by n may also be greater than 80%, 85%, 90% or 95% the native pixel density in the vertical direction. In a number of embodiments, the native pixel density of the display in the horizontal direction divided by n is greater than or equal to the native pixel density in the vertical direction. The display system further includes view selector that, for each of two or more viewing perspectives, makes one of the views visible, and a multiplexer system adapted to controllably shift light horizontally from each the plurality of pixels as a function of time to provide at least twice the number of views as provided without the multiplexer system. A focal length of the lenses of the view selector is greater than twice a width of the lenses of the view selector.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the claimed invention will be pointed out in the appended claims.

DETAILED DESCRIPTION

Figure 1:
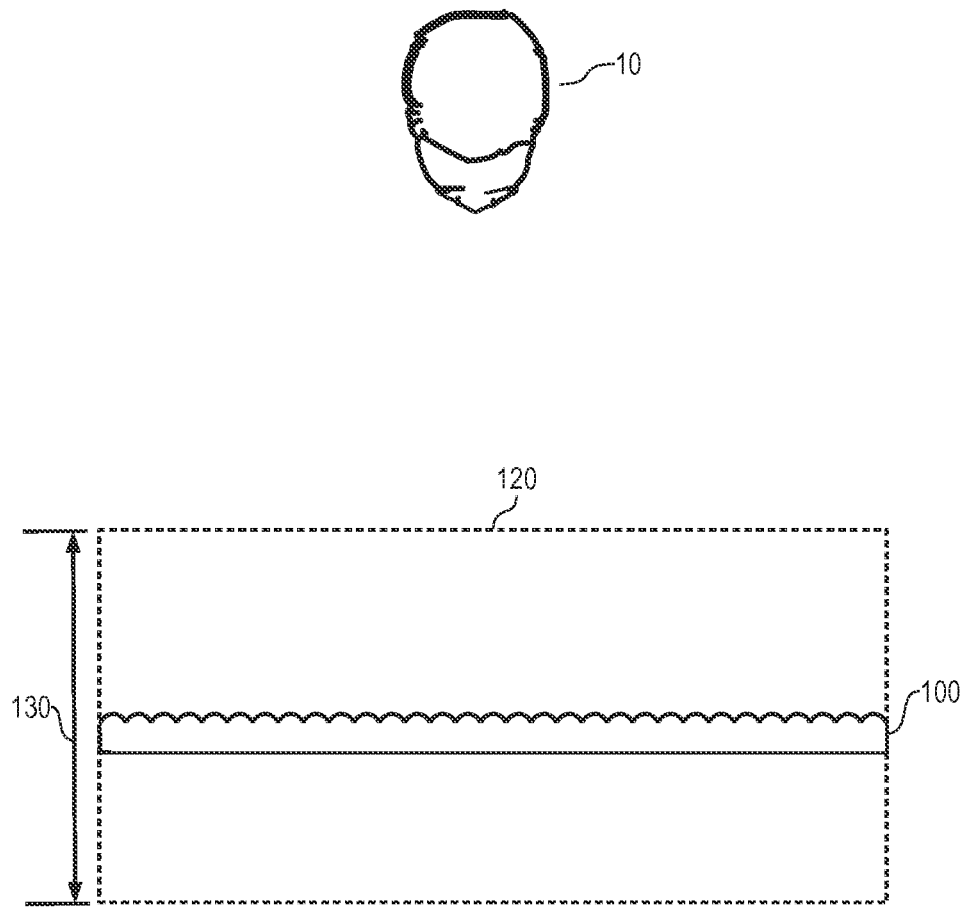
FIG. 1 illustrates a plan view of a viewer and an autostereoscopic display.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a pixel" includes a plurality of such pixels and equivalents thereof known to those skilled in the art, and so forth, and reference to "the pixel" is a reference to one or more such pixels and equivalents thereof known to those skilled in the art, and so forth.

In addition, "a view" is used herein to refer to a subset of an image presented to a viewer from a particular angle of view. As an example, it is helpful to consider a simple autostereoscopic display in which one eye of the human viewer can see every odd-numbered column of pixels and the other eye of the viewer can see every even-numbered column of pixels. The odd-numbered columns of pixels would collectively represent one view, and the even-numbered columns of pixels would collectively represent another view. Autostereoscopic displays may have many more than just two views, and that this very simple example is merely to illustrate how the term "view" is used herein.

As used herein, a "pixel" is a picture element that is capable of displaying every color that the display of which the pixel is a part can display, and a "sub-pixel" is a picture element that is incapable of such without the cooperation of other sub-pixels of a given pixel, and each sub-pixel just emits one fixed or pre-determined color of light. Most color display devices in use today include a single red sub-pixel, a single green sub-pixel, and a single blue sub-pixel positioned in close juxtaposition to provide the appearance of a single pixel that can display any color in the red-green-blue (RGB) color space. Other color combinations of sub-pixels may be used. Creation of sub-pixels of various color components such as red, green, and blue—as well as addressing and control of individual sub-pixels to produce a single pixel of a specified color—are well known and are not described herein.

In a number of embodiments hereof, a single physical pixel of a video display can display respective individual pixels of multiple views. In other words, a video display can include more views for an autostereoscopic image than the physical pixels of the video display would ordinarily support.

To achieve multiple views with a single physical pixel, the physical pixel is time-multiplexed. For example, the physical pixel may display a pixel of one view for a given time interval and a view multiplexer may deflect the light from the physical pixel by a predetermined angle to make the pixel appear in a location corresponding to the pixel of the view. In another time interval, the physical pixel may display a pixel of a different view and the view multiplexer may deflect light from the physical pixel by a different predetermined angle to make the pixel appear in a location corresponding to the pixel of the different view.

The view multiplexer may, for example, include a number of columnar prisms of birefringent material such that deflection of light passing through the columnar prisms is switchable between, for example, two different angles by controlling the polarity of the light passing through. Alternatively, the material of the columnar prisms may vary its refraction index according to an input signal such as an electrical field of the columnar prisms. An example of such a material is liquid crystal. The controllability of the reflection angles provided by the columnar prisms enables control of the location at which a given pixel appears to be to a human viewer.

Synchronizing the location at which a given pixel appears to be and the particular view displayed by the pixel allows that pixel to display pixels of multiple views for respective fractions of a frame rate. Persistence of vision of the human viewer causes the one pixel of the one view that is visible to the viewer through the lenticular array to continue to be perceived for the entire frame.

Multiple view multiplexers may, for example, be stacked in a view multiplexer system hereof to provide a wider variety of cumulative deflection angles. The use of view multiplexers in an autostereoscopic display is discussed in U.S. patent application Ser. No. 12/969,552, the disclosure of which is incorporated herein by reference.

Figure 2A:
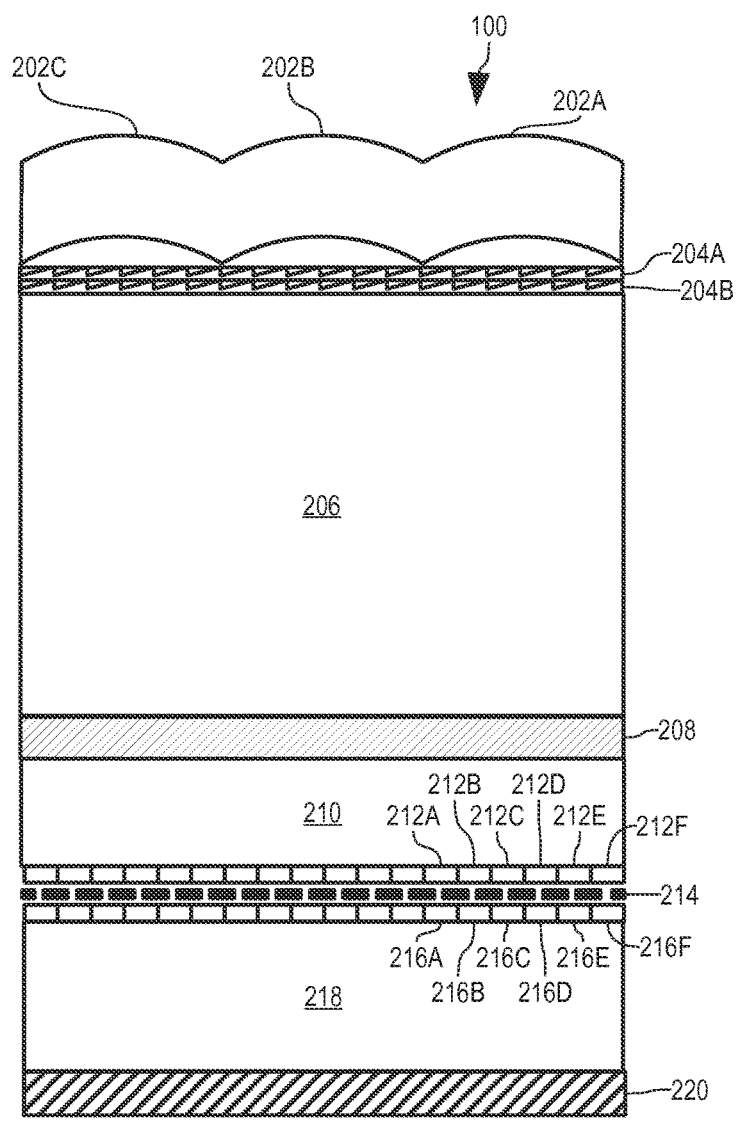
FIG. 2A illustrates a plan view of a portion of the autostereoscopic display of FIG. 1 in greater detail.
Figure 2B:
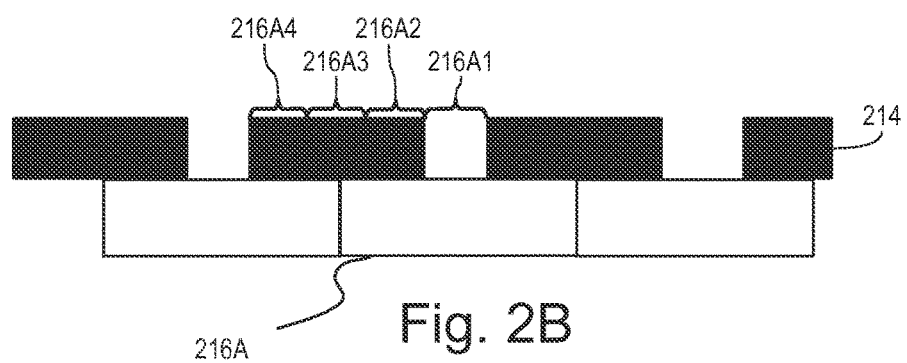
FIG. 2B is a plan view of the mask of FIG. 2A enlarged to illustrate locations of apparent pixels as a result of operation of the view multiplexers of FIG. 2A.

FIGS. 1 and 2A illustrate a representative embodiment of a stereoscopic display 100 including a view multiplexer system including view multiplexers 204A and 204B (see FIG. 2A) that shift, bend or refract light from each of a number of pixels, such as pixels 216A-F (LCDs in the illustrated embodiment), such that each pixel appears to be at a slightly different location and represents a pixel of a different view for each of a number of multiple time intervals. For example, view multiplexers 204A and 204B may cause pixel 216A to be at any of locations 216A1, 216A2, 216A3, and 216A4 as illustrated in FIG. 2B. In this manner, each of pixels 216A-F is time-multiplexed to represent pixels of respective multiple views of an autostereoscopic display.

In a manner described more completely below, view multiplexers 204A and 204B combine to provide 4-to-1 multiplexing in this illustrative embodiment. View multiplexers 204A and 204B bend light from pixels 216A-F at predetermined, fractional view angles at predetermined time intervals. For example, lenticle 202C is designed to provide a view angle increment of one degree, meaning that viewing perspectives through lenticle 202C at which each of pixels 216A-F is, for example, viewable through a mask 214 differ by one degree. To provide four views from a single pixel, view multiplexers 204A and 204B may, for example, combine to deflect light at four, evenly spaced, fractional view angles—namely, 0 degrees, 0.25 degrees, 0.5 degrees, and 0.75 degrees in this representative embodiment. Other angles may, for example, be used in other embodiments. A single view multiplexer may, for example, provide two views from a single pixel. Three view multiplexers may, for example, be combined to provide up to eight views from a single pixel. Numerous other combinations may be implemented to provide even more views from a single pixel. Moreover, a view multiplexer may sweep across a range of deflection angles to provide other numbers of views from a single pixel in the manner described below.

Figure 4:
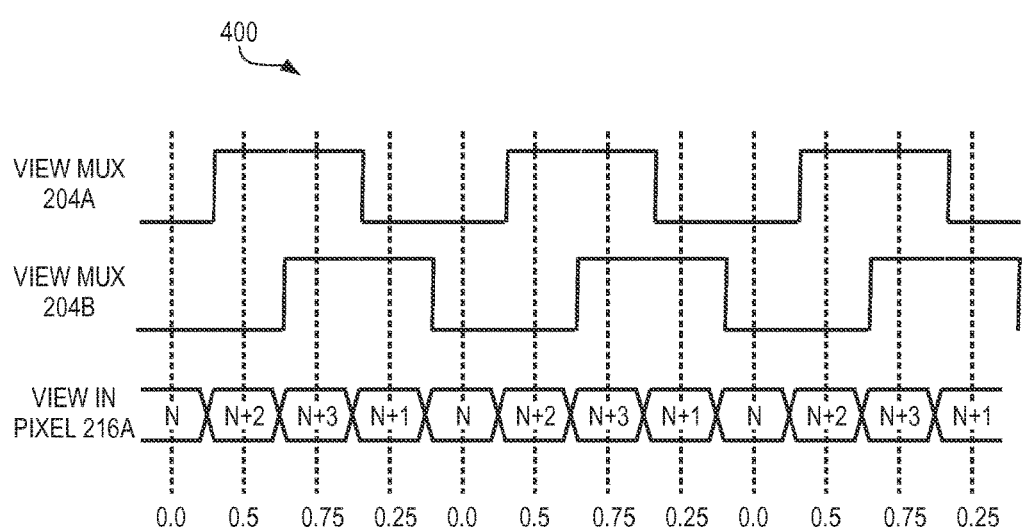
FIG. 4 illustrates an embodiment of a timing diagram illustrating the time-multiplexing of a pixel using two view multiplexers.

Display of four views using a single one of pixels 216A-F is shown in timing diagram 400 of FIG. 4. As described more completely below, view multiplexer 204A is, for example, switchable between deflecting light at 0.5 degrees or not deflecting light at all. View multiplexer 204B is, for example, switchable between deflecting light at 0.25 degrees or not deflecting light at all. View multiplexers 204A and 204B may, for example, switch at a rate of 120 Hz. View multiplexer 204B may, for example, follow view multiplexer 204A by a lag of one-half clock cycle as shown in timing diagram 400.

Pixels 216A-F may, for example, have a refresh rate of 240 Hz. Initially in timing diagram 400, view multiplexers 204A and 204B are both off (that is, not deflecting light), and pixel 216A displays a pixel of view N for a single refresh cycle. If an eye of viewer 10 is aligned with pixel 216A through, for example, mask 214 and lenticle 202A, that eye will see view N of pixel 216A at location 216A1 (see FIG. 2B) and the pixel of view N will appear to occupy the entire width of lenticle 202A (FIG. 2A). When pixel 216A is displaying pixels of other views, the deflection of view multiplexers 204A and 204B causes the eye to see pixels of such other views if the eye of viewer 10 is aligned therewith. However, the persistence of vision causes viewer 10 to continue to see the pixel of view N at location 216A1 (FIG. 2B) for four 240 Hz cycles if the eye of viewer 10 is aligned therewith.

In the next 240 Hz cycle (FIG. 4), view multiplexer 204A switches on. The cumulative deflection of view multiplexers 204A and 204B is 0.5 degrees, and pixel 216A appears to be at location 216A3 (FIG. 2B) and displays a pixel of view N+2 (see FIG. 4) for a single refresh cycle. If an eye of viewer 10 is 0.5 degrees from being aligned with pixel 216A through mask 214 and lenticle 202A, that eye will see view N+2 of pixel 216A and the pixel of view N+2 will appear to occupy the entire width of lenticle 202A. Mask 214 and the persistence of vision cause viewer 10 to continue to see the pixel of view N+2 at location 216A3 (see FIG. 2B) for four 240 Hz cycles as described above.

In the next 240 Hz cycle (FIG. 4), view multiplexer 204B switches on. The cumulative deflection of view multiplexers 204A and 204B is 0.75 degrees, and pixel 216A appears to be at location 216A4 (FIG. 2B) and displays a pixel of view N+3 (FIG. 4) for a single refresh cycle. If an eye of viewer 10 is 0.75 degrees from being aligned with pixel 216A through mask 214 and lenticle 202A, that eye will see view N+3 of pixel 16A and the pixel of view N+3 will appear to occupy the entire width of lenticle 202A. Mask 214 and the persistence of vision cause viewer 10 to continue to see the pixel of view N+3 at location 216A4 (FIG. 2B) for four (4) 240 Hz cycles as described above.

In the next 240 Hz cycle (FIG. 4), view multiplexer 204A switches off. The cumulative deflection of view multiplexers 204A and 204B is 0.25 degrees, and pixel 216A appears to be at location 216A2 (FIG. 2B) and displays a pixel of view N+1 (FIG. 4) for a single refresh cycle. If an eye of viewer 10 is 0.25 degrees from being aligned with pixel 216A through mask 214 and lenticle 202A, that eye will see view N+1 of pixel 216A and the pixel of view N+1 will appear to occupy the entire width of lenticle 202A. Mask 214 and the persistence of vision cause viewer 10 to continue to see the pixel of view N+1 at location 216A2 (FIG. 2B) for four 240 Hz cycles as described above.

In the next 240 Hz cycle (see FIG. 4), view multiplexer 204B switches off. The cumulative deflection of view multiplexers 204A and 204B is 0 degrees, and pixel 216A again displays a pixel of view N and appears to be at location 216A1 (FIG. 2B) for a single refresh cycle. The four-cycle pattern of timing diagram 400 repeats.

Thus, view multiplexers 204A and 204B time-multiplex pixels 216A-F such that each pixel can display a pixel of four different views of autostereoscopic display 100. Without lenticles 202A-C, pixel 216A would appear to a human viewer to be four distinct pixels at locations 216A1, 216A2, 216A3, and 216A4 as illustrated in FIG. 2B. Thus, without a lenticular array or other view selector, view multiplexers 204A and 204B cause a display to have an apparent horizontal resolution that is much more dense than the physical or native resolution of the display.

There are alternatives to a lenticular array to ensure that a human viewer sees only one of the multiple views of an autostereoscopic image. For example, a microlens array system or a parallax barrier may be used. A microlens array, is an array of lenslets (or small lenses).

As shown in FIG. 2A, autostereoscopic display 100 includes a number of lenticles 202A-C of a lenticular array. Lenticles 202A-C may, for example, be designed to provide a relatively flat field in the manner described in U.S. patent application Ser. No. 12/901,478, the disclosure of which is incorporated herein by reference. For example, the focal length of lenses of the lenticular lens system or the microlens array system may, for example, be greater than twice a width of the lenses of the lenticular lens system or the microlens array system, greater than five times a width of the lenses of the lenticular lens system or the microlens array system or greater than ten times a width of the lenses of the lenticular lens system or the microlens array system.

View multiplexers 204A and 204B are immediately below the lenticular array in the illustrated embodiment. View multiplexers 204A and 204B are described in more detail below in conjunction with FIG. 3. In the illustrated embodiment, below view multiplexers 204A and 204B is, for example, a layer 206 of transparent material such as plastic, glass, or a gas such as air, a polarizer 208, and a second layer 210 of transparent material.

Below layer 210, for example, is an array of color filters 212A-F, each of which imparts a red, green, or blue hue to a respective one of pixels 216A-F.

Mask 214 is positioned between color filters 212A-F and pixels 216A-F and limits the perceived width of pixels 216A-F to about one-quarter their actual width in the representative embodiment, leaving dark space between pixels 216A-F for apparent pixels as a result of light deflection by operation of view multiplexers 204A and 204B. In this illustrative embodiment, the field of focus of lenticles 202A-C is at about mask 214.

Pixels 216A-F are positioned immediately below mask 214. Each of pixels 216A-F may, for example, be a single, independently addressable/controlled LED, LCD or OLED sub-pixel, having its own independently controlled display intensity. The color of each of pixels 216A-F may, for example, be controlled by a respective one of color filters 212A-F. OLED sub-pixels may, for example, emit colored light without the use of a color filter. In the illustrated embodiment of FIG. 2A, LCD sub-pixels are used. Below pixels 216A-F is, for example, another layer 218 of transparent material and a polarizer 220. Behind polarizer 220 may, for example, be a light source (not shown) as is typical in conventional LCD displays. Polarizers 208 and 220 may, for example, be similar to polarizers used in conventional LCD displays.

Figure 3:
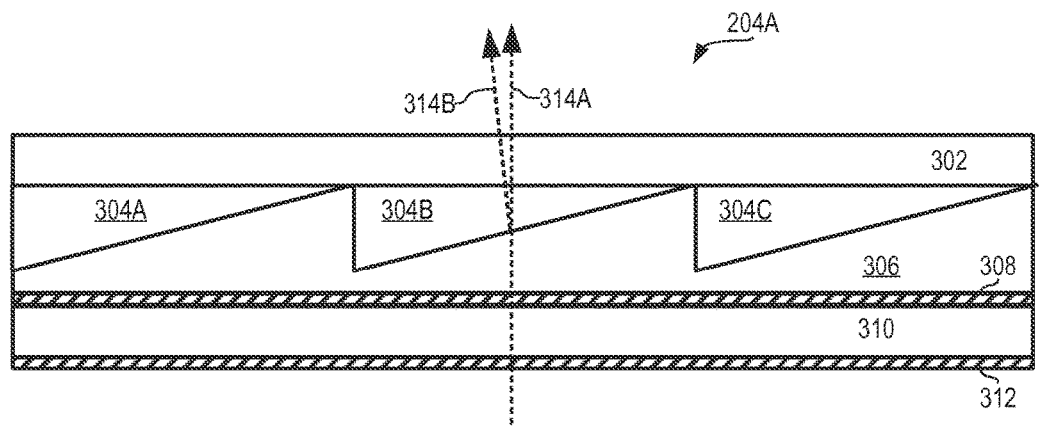
FIG. 3 illustrates a plan view of an embodiment of a view multiplexer of the autostereoscopic display of FIGS. 1 and 2 in greater detail.

View multiplexer 204A is shown in greater detail in FIG. 3. Except as otherwise noted herein, view multiplexer 204B is directly analogous to view multiplexer 204A and the following description is also applicable to view multiplexer 204B. In FIG. 3, view multiplexer 204A is shown in cross-sectional view from the side. View multiplexer 204A includes triangular columns 304A-C of birefringent material such as liquid crystal. Triangular columns 304A-C may, for example, be positioned between a layer 302 of transparent plastic or glass and a grooved layer 306 of transparent plastic or glass into which triangular grooves are made to provide space for triangular columns 304A-C.

Below layer 306 is a switch layer 310 of liquid crystal between electrode layers 308 and 312. By selectively applying a charge to electrode layers 308 and 312, polarization of light passing through switch layer 310 can be switched (for example, between parallel and perpendicular orientations relative to the birefringent material in triangular columns 304A-C).

The birefringent material (the orientation of which may be set at manufacture) and the size and shape of triangular columns 304A-C are selected to provide one amount of light deflection with one polarization orientation of switch layer 310 and a different amount of deflection with the other polarization orientation of switch layer 310. In effect, the birefringent material in triangular columns 304A-C are prisms whose degree of light deflection vary according to the state of switch layer 310.

In the illustrated embodiment, the birefringent material is selected to have one refraction index substantially equal to the refraction index of the transparent material of layers 302 and 306, and therefore provides no deflection of light as shown by arrow 314A, for one polarization orientation of switch layer 310. In effect, the prisms of triangular columns 304A-C disappear into layers 302 and 306, and triangular columns 304A-C and layers 302 and 306 appear to be a single, flat layer of transparent material. However, it is not necessary that the prisms provide a deflection of zero degrees to effectively disappear into layers 302 and 306. As long as the prisms are controllable to provide one of at least two different angles of deflection, pixel 216A can be made to appear in one of at least two different, perhaps overlapping, locations and thus serve the purpose of time-multiplexing of pixel 216A.

For the other polarization orientation of switch layer 310 in the illustrated embodiment, the birefringent material (the orientation of which may be set at manufacture) and the size and shape of triangular columns 304A-C in view multiplexer 204A are selected to deflect light by 0.5 degrees as shown by arrow 314B, and the birefringent material and the size and shape of triangular columns 304A-C in view multiplexer 204B are selected to deflect light by 0.25 degrees. In effect, the different refraction index of the birefringent material with this polarization orientation and the dimensions of triangular columns 304A-C are prisms designed to reflect light by a predetermined desired angle, such as 0.5 degrees in view multiplexer 204A and 0.25 degrees in view multiplexer 204B in this illustrative embodiment.

Figure 5:
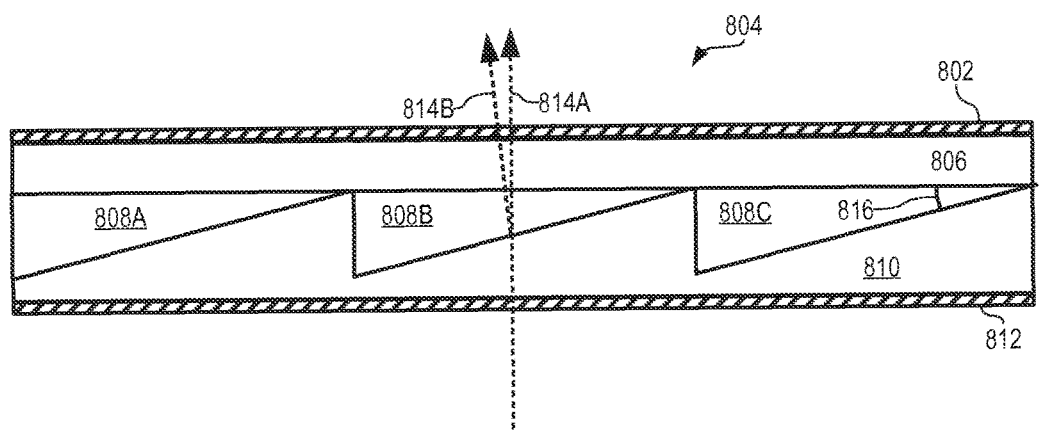
FIG. 5 illustrates a plan view of another embodiment of a view multiplexer.

As described briefly above, a single view multiplexer 804 may sweep across a range of deflection angles to provide a number of views from a single pixel. As illustrated in FIG. 5, view multiplexer 804 includes triangular columns 808A-C of a material whose refraction index is controllable (for example, by an electrical field). An example of such a material is liquid crystal. Triangular columns 808A-C are positioned between a layer 606 of transparent plastic or glass and a grooved layer 810 of transparent plastic or glass into which triangular grooves are made to provide space for triangular columns 808A-C.

In front of layer 806 is an electrode layer 802. Behind layer 810 is an electrode layer 812. By selectively applying a charge to electrode layers 802 and 812, the refraction index of the material in triangular columns 808A-C can be varied.

The material within triangular columns 808A-C (the orientation of which may be set at manufacture) and the size and shape of triangular columns 808A-C may be selected to provide a desired range of deflection across the range of electrical fields that can be produced across electrode layers 802 and 812. In effect, the material in triangular columns 808A-C are prisms whose degree of light deflection vary according to the electrical field between electrode layers 802 and 812.

In the illustrated embodiment, the desired range of deflection may, for example, be 0.0-2.0 degrees. The material within triangular columns 808A-C may, for example, have a refraction index that varies from the refraction index of layers 806 and 810 to 0.1 above the refraction index of layers 806 and 810. Triangular columns 808A-C may, for example, have cross-sections that are right triangles with an angle 816 of 20 degrees.

Figure 6:
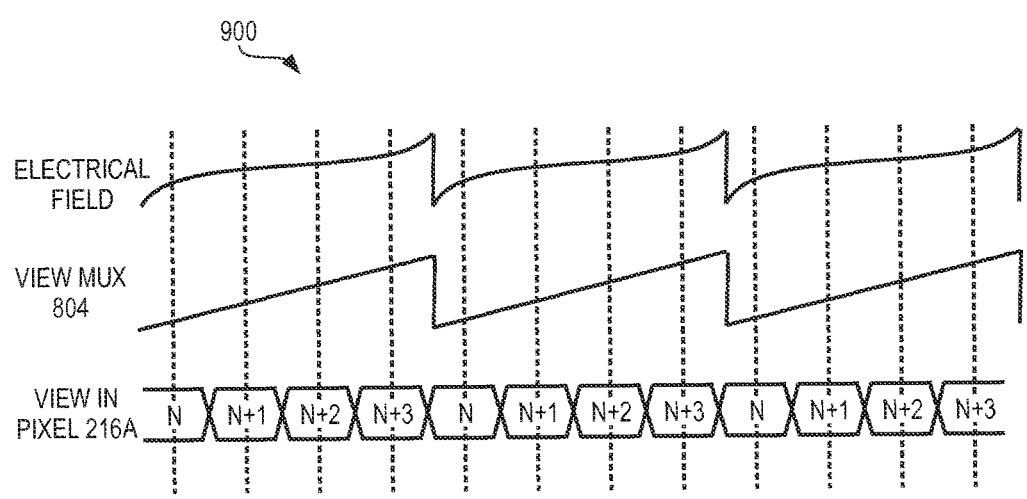
FIG. 6 illustrates embodiments of timing diagrams illustrating time-multiplexing of a pixel using the view multiplexer of FIG. 3.

Timing diagram 900 of FIG. 6 illustrates the time-multiplexing of pixel 216A using view multiplexer 804. Timing diagram 900 shows an electrical field between electrode layers 802 and 812, the corresponding angle of deflection of view multiplexer 804, and various views displayed by pixel 216A. The angle of deflection provided by view multiplexer 804 sweeps through a predetermined range, e.g., 0-2.0 degrees. Pixel 216A displays pixels of views N through N+3 in a synchronized manner such that pixel 216A displays a pixel of view N while view multiplexer 804 sweeps through deflection angles 0.0-0.5 degrees, displays a pixel of view N+1 while view multiplexer 804 sweeps through deflection angles 0.5-1.0 degrees, displays a pixel of view N+2 while view multiplexer 804 sweeps through deflection angles 1.0-1.5 degrees, and displays a pixel of view N+3 while view multiplexer 804 sweeps through deflection angles 1.5-2.0 degrees, after which view multiplexer 804 returns to provide a deflection of 0 degrees and pixel 216A displays a pixel of the next frame of view N.

While pixel 216A is shown to time-multiplex only four views, pixel 216A can time-multiplex many more views, limited only by the switching rate of pixel 216A relative to a desired frame rate. For example, in embodiments in which pixel 216A is implemented using one or more LEDs (for example, in very large signage), pixel 216A can switch much more rapidly than the case of an LCD pixel, and can time-multiplex many more views. For example, some LEDs can switch at frequencies of greater than 1 KHz. Accordingly, a single LED (or a cluster of red, green, and blue LEDs) can provide 10 or more views of single pixel, limited only by the optical quality of lenticles 202A-C and the range of deflection angles and switching speed of view multiplexer 804.

Figure 7:
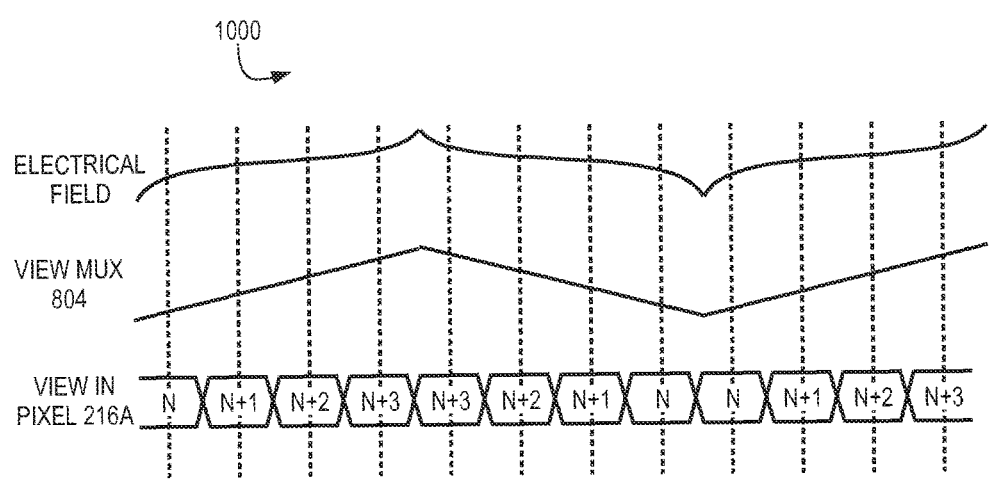
FIG. 7 illustrates additional embodiments of timing diagrams illustrating time-multiplexing of a pixel using the view multiplexer of FIG. 3.

Timing diagram 1000 of FIG. 7 shows an alternative manner in which view multiplexer 804 can time-multiplex pixels of multiple views shown by pixel 216A. Once view multiplexer 804 sweeps through a range of deflection angles (for example, 0-2.0 degrees), view multiplexer 804 sweeps back through the range in reverse direction (for example, from 2.0 degrees to 0 degrees). In a synchronized manner, once pixel 216A switches through pixels of views N, N+1, N+2, and N+3, pixel 216A switches through pixels of a subsequent frame in reverse order (that is, through views N+3, N+2, N+1, and N).

View multiplexer 804 may cycle through angles of deflection in other ways, including stepped patterns. In addition, multiple instances of view multiplexer 804 may be stacked as are view multiplexers 204A and 204B to provide greater ranges of cumulative deflection angles.

Conventional pixels typically include three sub-pixels, each of which occupies the full height of the pixel and only about a third of the width of the pixel. In other words, each of these sub-pixels is about three (3) times as tall (vertical dimension) as it is wide (horizontal dimension). In general, if a display has X×Y pixels, then if Y is greater than X, the direction of the Y pixels is considered the horizontal direction. As described above, a view selector such as a lenticular array presents one of n pixels to each eye of a viewing person wherein x is the number of views. Thus, the lenticular array provides n different views that are viewable from various points of view. The lenticular array distorts the appearance of a presented pixel of a view to fill essentially the entirety of the space of all n underlying pixels. Each eye of the viewer of an autostereoscopic display sees an image having a horizontal resolution which is diminished by 1/n. For example, an autostereoscopic display with two views, four views or nine views, will result in a perceived reduction in horizontal resolution of one-half, one-fourth, one-ninth, respectively, of the original horizontal resolution. At the same time, the vertical resolution of the image as perceived by the viewer remains unchanged, resulting in an unpleasant and noticeable imbalance in the horizontal and vertical resolutions of the displayed image.

U.S. patent application Ser. No. 12/868,038 and U.S. Provisional Patent Application No. 61/810,250 filed Apr. 9, 2013, the disclosures of which are incorporated herein by reference, described displays including tall, thin, vertically extending or "vertical" pixels to display views of autostereoscopic images. Such "vertical pixels" may, for example, be at least twice as tall as they are wide. More typically, the vertical pixels are more than eight (8) times as tall as they are wide. As a result, the horizontal stretching of vertical pixels in an autostereoscopic display is somewhat balanced, making horizontally stretched pixels if the autostereoscopic display that, for example, appear generally square-ish to a human viewer. In addition, the effective horizontal resolution of the views as perceived by a human viewer is significantly improved, allowing autostereoscopic displays to provide higher-quality images and/or to provide addition views. As used herein, the horizontal direction refers to a plane passing through a viewer's eyes.

As, for example, described in U.S. Provisional Patent Application No. 61/810,250, such vertical pixels may be formed by reorienting, rearranging and/or regrouping pixels of various pixel arrangements including, for example, RGB stripe pixel arrangements, delta pixel arrangements, mosaic pixel arrangements etc. Optical shifting of sub-pixel position and/or masking of portions thereof may also be used. In still other embodiments, a display may be manufactured to natively exhibit vertically extending or vertical pixels.

In a number of embodiments hereof, to provide a balanced display after the horizontal stretching associated with multiple horizontal views, vertical pixels are used so that the native pixel density of a display hereof in the horizontal direction divided by the number of views in the horizontal direction (n) is greater than or equal to a native pixel density of the display in the vertical direction (wherein n is an integer greater than or equal to 2). The term "native pixel density" refers to the physical number of sub-pixels/pixels physically built into the display as, for example, viewed under a microscope.

As described above, time multiplexers hereof controllably shift light from the pixels as a function of time to provide m times as many views as provided without the multiplexer, wherein m is an integer of at least 2. The time multiplexer, which is optically coupled to and electrically synchronized with the display, divides each frame of the native display into m sub-frames The multiplication of views increases the perceived pixel density in the horizontal directions. In a number of embodiments, the perceived pixel density of the display in the horizontal direction divided by n·m is greater than or equal to the native pixel density in the vertical direction.

Figure 8A:
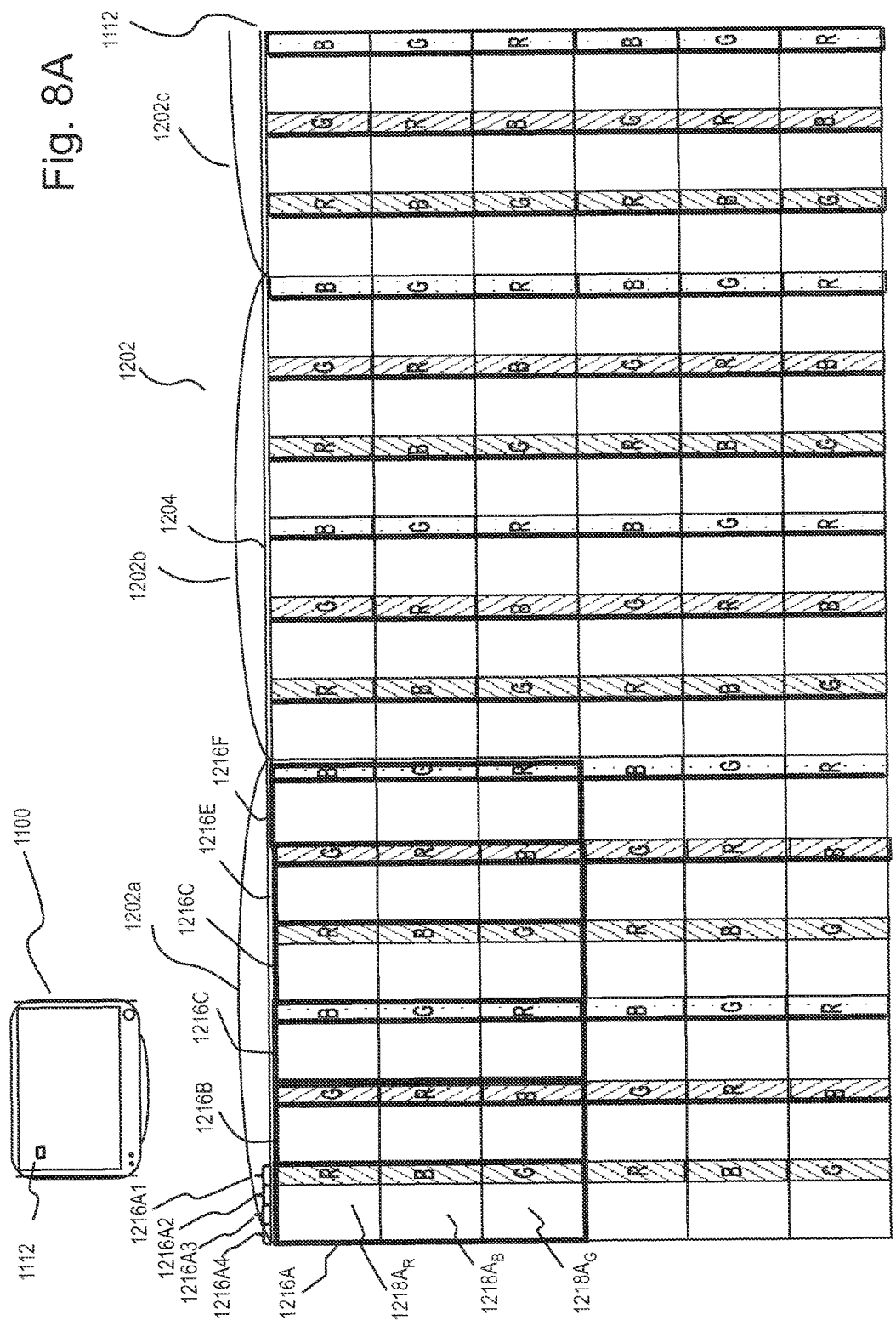
FIG. 8A illustrates a display comprising an embodiment of a pixel pattern for use in connection with a view multiplexer system.
Figure 8B:
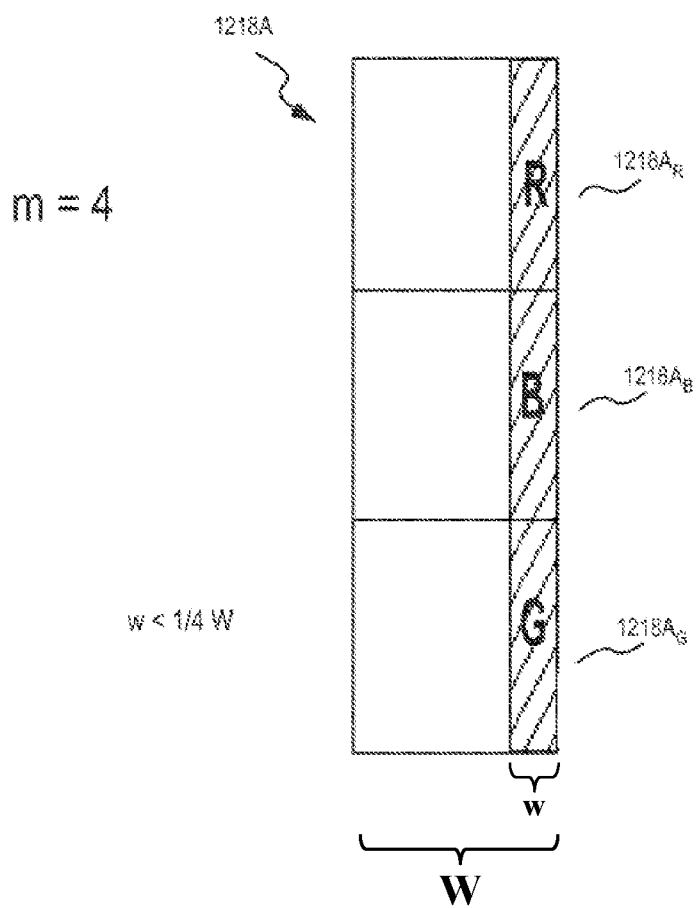
FIG. 8B illustrates an enlarged pixel of the display of FIG. 8A.

FIG. 8A (which is not necessarily drawn to scale) illustrates schematically an enlarged portion 1112 of display 1110 (of, for example, a device such as a monitor or a television) in vertical alignment with a view selector, which is, for example, a lenticular array 1202 including lenticles 1202a, 1202b, 1202c etc., wherein display 1110 has a pixel density as described above. Portion 1112 includes individual pixels 1216A, 1216B, 1216C, 1216C, 1216F etc. Referring, for example, to pixels 1216A, each of pixels has a vertically extending aspect ratio and includes relatively thin, relatively tall, red, green, and blue sub-pixels in a vertically end-to-end arrangement. Pixel 1216A includes, for example, red sub-pixel 1218A$_R$, green sub-pixel 1218A$_G$, and blue sub-pixel 1218A$_B$. FIG. 8B illustrates an enlarged view of pixel 1216A, including red sub-pixel 1218A$_R$, green sub-pixel 1218A$_G$, and blue sub-pixel 1218A$_B$.

Figure 9:
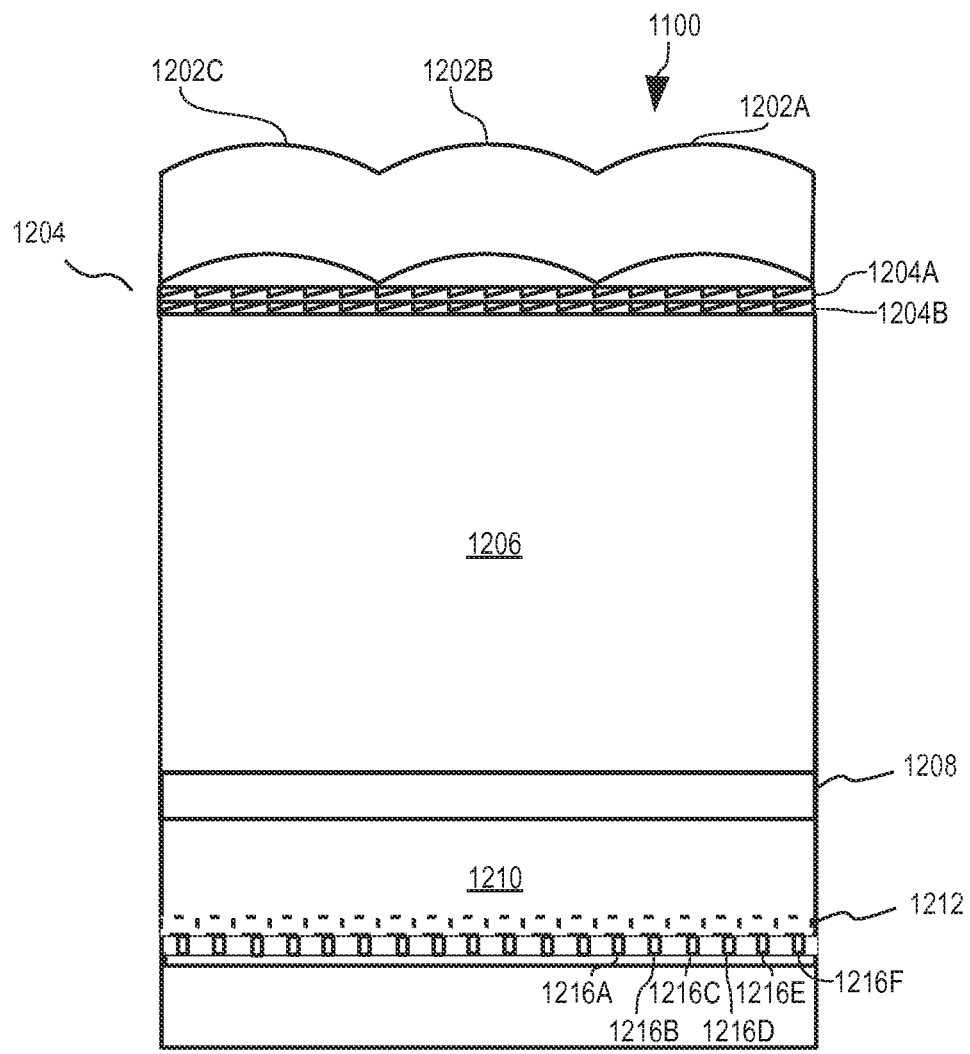
FIG. 9 illustrates a plan view of a portion of the autostereoscopic display of FIG. 8A in greater detail.

FIGS. 8A through 9 illustrate autostereoscopic display 1110 including a view multiplexer system including, for example, two multiplexers 1204A and 1204B (see FIG. 9; which are similar in operation to view multiplexers 204A and 204B) that bend light from each of a number of pixels, such as pixels 1216A-F, such that each perceived pixel appears to be at a slightly different location and represents a pixel of a different view for each of a number of multiple time intervals. For example, view multiplexers 1204A and 1204B may cause pixel 1216A to be perceived at any of locations 1216A1, 1216A2, 1216A3, and 1216A4 as illustrated in FIGS. 8A and 9 (and as discussed in connection with multiplexers 204A and 204B). In this manner, each of the pixels is time-multiplexed to represent pixels of respective multiple views of autostereoscopic display 1110.

In the embodiments of FIGS. 8A through 9, pixels 1216A-F etc. may, for example, include OLED sub-pixels. In the illustrated embodiment of FIG. 9, below view multiplexers 1204A and 1204B is, for example, a layer 1206 of transparent material such as plastic, glass, or a gas such as air, a polarizer 1208, and a second layer 1210 of transparent material/

As described above, placing masking over portions of light emitting areas of a display may, for example, be used to create a dark or non-emissive space for apparent pixels created as a result of light deflection by operation of view multiplexers 1204A and 1204B. In the embodiment of FIGS. 8A through 9, however, sub-pixels may inherently have a limited fill factor (as opposed to a fill factor effectively limited by masking) to create non-emissive space for multiplexed apparent pixels. In that regard, the fill factor for each sub-pixel (see, for example, sub-pixels 1218A$_R$, 1218A$_B$ and 1218A$_G$ of pixel 1218) may be less than 1/m (wherein the multiplexer(s) provide m times as many views as provided without the multiplexer(s) as described above). The term "fill factor" as used herein refers to the ratio between the light emitting surface area or active area of a sub-pixel and the total surface area of the sub-pixel. As used herein, the term "active area" of sub-pixel refers to the light emitting area of the sub-pixel (that is, the portion of the sub-pixel that emits light). Using sub-pixels of limited fill factor as described above, eliminates the need for masking and provides for lower power consumption/improved efficiency. As, for example, illustrated in FIGS. 8A and 8B, a width w of an active area of a sub-pixel (that is, the shaded area in the figures) may be less than 1/m times a width W of the sub-pixel (while the height of the active area extends to the full height of the sub-pixel). In FIGS. 8A and 8B, m=4, and w is less than ¼·W. In a number of embodiments, the aperture ratio (width/height) of the active area of a sub-pixel is less than 1/m. Pixels having such a limited fill factor provide for good visual performance and prevent cross talk upon time multiplexing as described herein.

In a number of embodiments hereof, organic light emitting devices or OLEDs are used in forming displays including sub-pixels as described above. In general, OLEDs provide for faster response times, allowing for higher rates of time multiplexing than, for example, LCDs. Moreover, the emissive area of an OLED may readily be patterned to the limited fill factor described above so that no light is blocked or wasted in masking.

There are several patterning approaches which may be used for OLED displays hereof. For example, OLED materials may be evaporated onto a substrate, and fine metal masks may be used for shadow masking during fabrication to ensure that only specific materials are deposited onto specific locations on the substrate enabling different colored OLEDs or sub-pixels to be realized. Another approach is to use white OLEDs everywhere and then define sub-pixel colors using color filters (represented, for example, in dashed lines as 1212 in FIG. 9). Solution processing can also be used, so that the OLED sub-pixels may be defined by a printing technique (for example, ink jet or slot printing).

Decreasing pixel fill factor as described above is similar to increasing resolution from a patterning perspective. Therefore, higher resolution patterning techniques may be used. For example, a white plus color filter pattern may be used or a yellow/blue plus two color filter approach may be used as disclosed in U.S. Patent Application No. 13,744,581, entitled High Resolution Low Power Consumption OLED Display with Extended Lifetime, filed Jan. 18, 2013, the disclosure of which is incorporated herein by reference. In the yellow/blue plus two color filter approach, a pixel includes a first sub-pixel having an emissive region configured to emit blue light and a second sub-pixel having an emissive region configured to emit yellow light. The pixel may also include two color filters or color altering layers.

During manufacturing, one may, for example, make the OLED emissive region (that is, the region or area over which emissive material extends) in each sub-pixel equal to the active area—or larger to allow for manufacturing tolerances. Making high resolution fine metal shadow masks with small openings is very challenging, so the larger the opening for each sub-pixel the easier it becomes to fabricate a display. Even with high resolution techniques, limiting the active pixel area/fill factor may lead to problems in forming very small OLED regions accurately during OLED deposition. Thus, it may be desirable to make the mask opening during manufacture as large as possible for a particular application, while not causing OLED material from one sub-pixel emissive layer to become part of a neighboring pixel (through, for example, vacuum deposition or printing). In such a case, the OLED emissive region or area may be larger than the active area (that is, larger than the shaded, light emitting area in FIG. 8B), and the active area may be defined or delineated to the required confines by one or both of the electrodes (for example, the anode) of the OLED. In a number of embodiments, the area of the emissive region in each sub-pixel is greater than m multiplied by the active area.

As fill factor is reduced, display lifetime may also be reduced. Use of tandem or stacked OLED pixels may be beneficial in improving display lifetime. Also, use of an RGB1B2 sub-pixel configuration as, for example, described in US Published Patent Application No. 2011/0248294, the disclosure of which is incorporated herein by reference, may also be beneficial in improving blue lifetime. In an RGB1B2 sub-pixel configuration, a pixel may include light blue (B1) sub-pixel, a dark blue (B2) sub-pixel, a green (G) sub-pixel and a red (R) sub-pixel. The B1 and B2 sub-pixels may, for example, be stacked and may be represented by the sub-pixels designated B in FIG. 8A. The deep blue sub-pixels are associated with a peak emissive wavelength of light less than the peak emissive wavelength of light associated with the light blue sub-pixels. In general, red sub-pixels emit light (associated with or passing through red sub-pixel areas) having peak wavelength in the visible spectrum of 580-700 nm; green sub-pixels emit light having a peak wavelength in the visible spectrum of 500-580 nm; and blue sub-pixels emit light having a peak wavelength in the visible spectrum of 400-500 nm. Light blue sub-pixels may, for example, emit light having a peak wavelength in the visible spectrum of 465-500 nm; and deep blue sub-pixels may, for example, emit light having a peak wavelength in the visible spectrum of 400-465 nm.

Figure 10A:
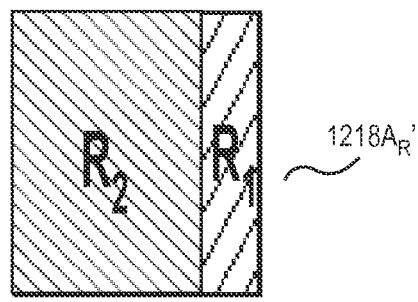
FIG. 10A illustrates an embodiment of a sub-pixel structure in which the sub-pixel includes separately and independently controllable emitting or active areas, wherein each of the active areas is emitting light.
Figure 10B:
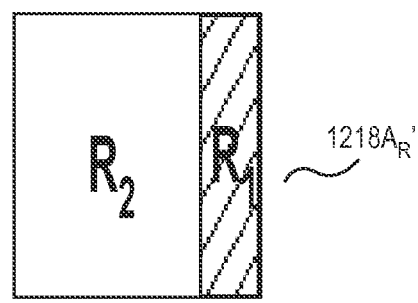
FIG. 10B illustrates the sub-pixel structure of FIG. 10A wherein only one of the active areas is emitting light.
Figure 10C:
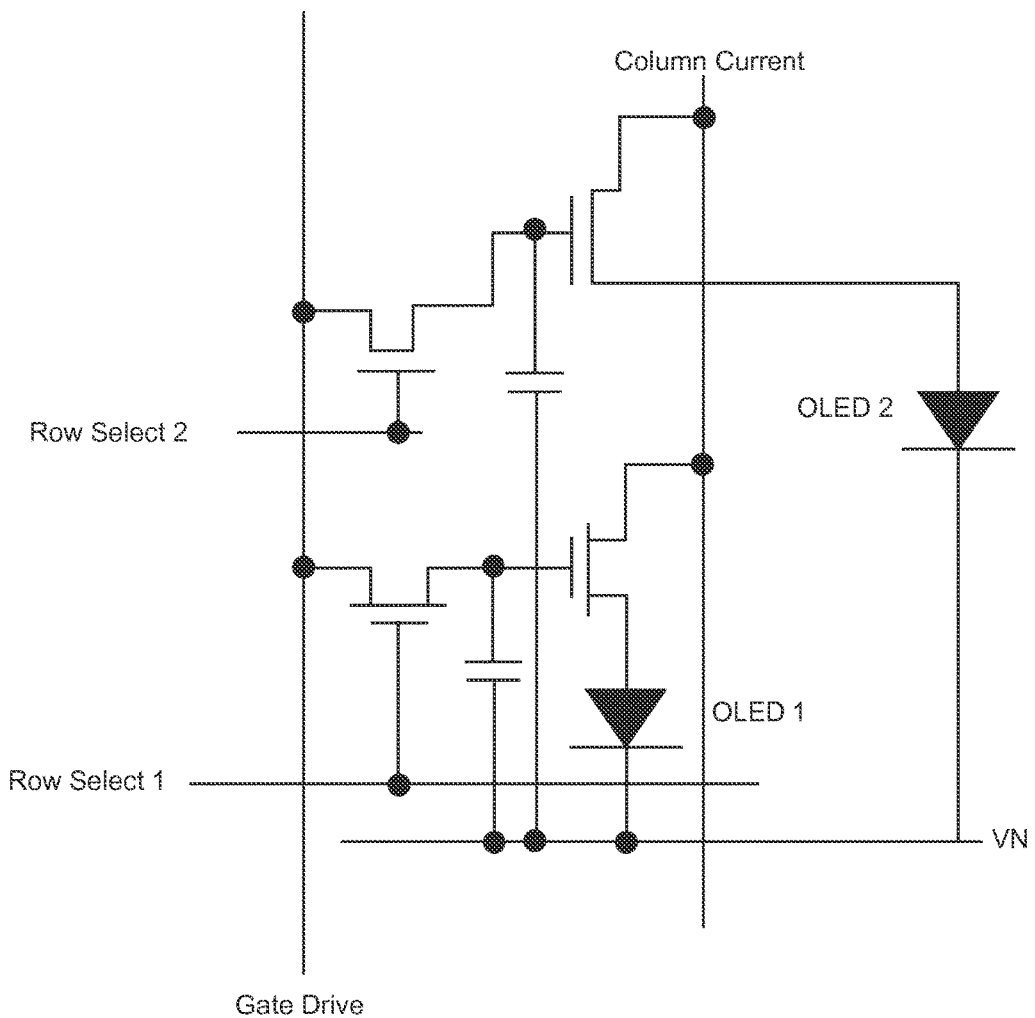
FIG. 10C illustrates an embodiment of circuitry for control of the sub-pixel structure of FIG. 10A.
Figure 10D:
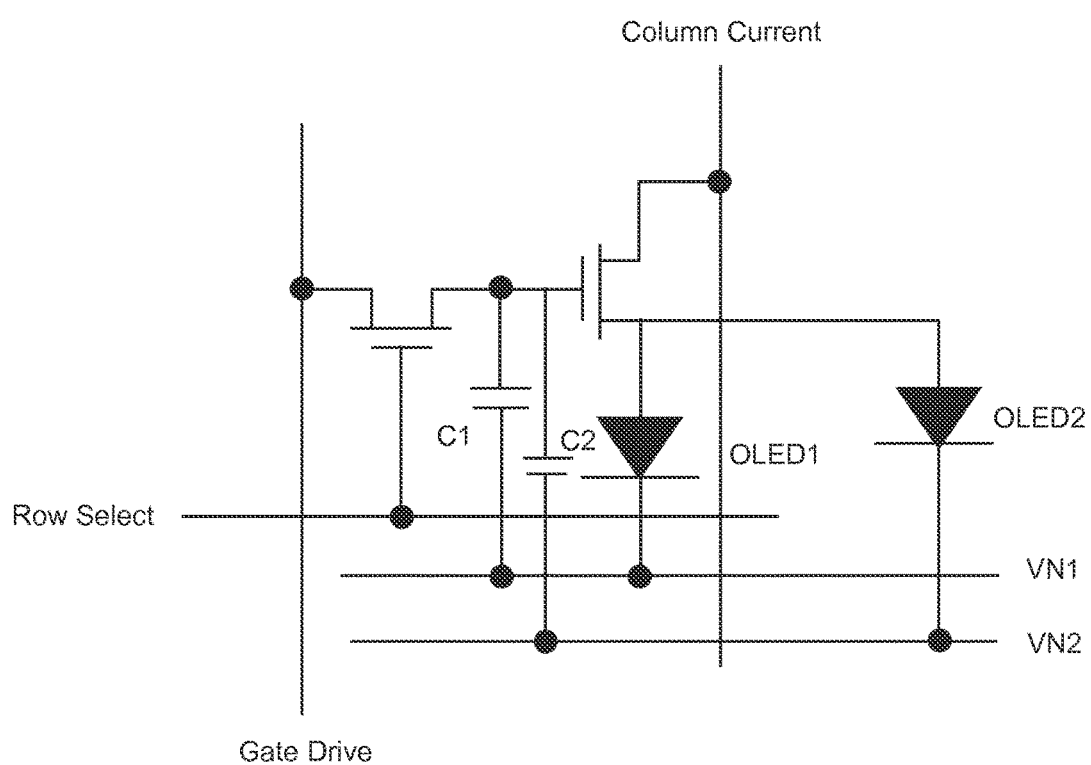
FIG. 10D illustrates another embodiment of circuitry for control of the sub-pixel structure of FIG. 10B.

In a number of embodiments, displays hereof may, for example, be operated in a two-dimensional (2D) or a three-dimensional (3D), autostereoscopic mode. During operation in a 2D mode and wherein no time multiplexing occurs, the limited fill factor of 1/m described above is not required. In a number of embodiments, each sub-pixel is formed to include two separately controllable light emitting or active areas (of the same color). As, for example, illustrated in FIGS. 10A and 10B, a red sub-pixel $1218A_R'$ includes one area $R_1$ having a fill factor which is less than 1/m as described above. Red sub-pixel $1218A_R'$ also includes another area $R_2$. Area $R_2$ may, for example, fill the remaining area of sub-pixel 1218A'. In a 2D mode with no time multiplexing, both areas of the sub-pixel are activated (such that both emit light) as illustrated by the shading of both areas in FIG. 10A. In a 3D/multiplexed mode (see FIG. 10B), only area $R_1$ (having a fill factor of 1/m) is activated. Light is not emitted from area $R_2$ in the 3D mode. Control of such dual area sub-pixels may, for example, be accomplished by either having two gate or row select lines to each pixel (see FIG. 10C), which are switched accordingly (that is, so that only an OLED 1 of area $R_1$ and not an OLED 2 of area $R_2$ is activated in the 3D mode, or so that both are activated at the same time in a 2D mode). Independent control of such dual area sub-pixels may also be accomplished using two global power supplies VN1 and VN2 to the OLED devices and switching globally depending on display mode (see FIG. 10D).

Generally, an OLED comprises at least one organic layer disposed between and electrically connected to an anode and a cathode. When a current is applied, the anode injects holes and the cathode injects electrons into the organic layer(s). The injected holes and electrons each migrate toward the oppositely charged electrode. When an electron and hole localize on the same molecule, an "exciton," which is a localized electron-hole pair having an excited energy state, is formed. Light is emitted when the exciton relaxes via a photoemissive mechanism. In some cases, the exciton may be localized on an excimer or an exciplex. Non-radiative mechanisms, such as thermal relaxation, may also occur, but are generally considered undesirable.

Early OLEDs used emissive molecules that emitted light from their singlet states ("fluorescence") as disclosed, for example, in U.S. Pat. No. 4,769,292, which is incorporated by reference in its entirety. Fluorescent emission generally occurs in a time frame of less than 10 nanoseconds.

More recently, OLEDs having emissive materials that emit light from triplet states ("phosphorescence") have been demonstrated. Baldo et al., "Highly Efficient Phosphorescent Emission from Organic Electroluminescent Devices," Nature, vol. 395, 151-154, 1998; ("Baldo-I") and Baldo et al., "Very high-efficiency green organic light-emitting devices based on electrophosphorescence," Appl. Phys.

Lett., vol. 75, No. 3, 4-6 (1999) ("Baldo-II"), which are incorporated by reference in their entireties. Phosphorescence is described in more detail in U.S. Pat. No. 7,279,704 at cols. 5-6, which are incorporated by reference.

Figure 11:
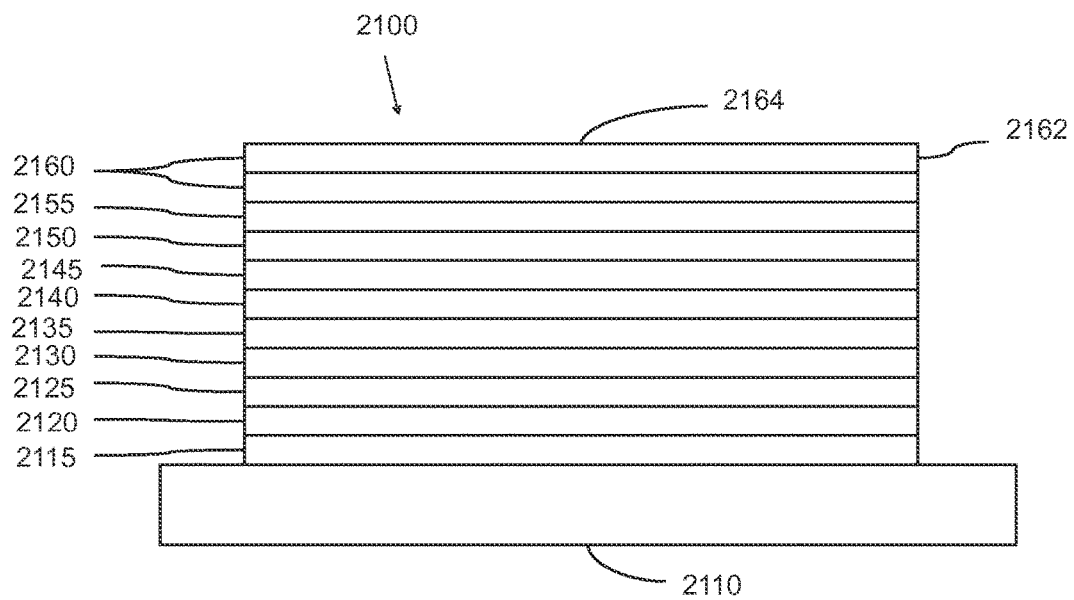
FIG. 11 illustrates schematically an embodiment of organic light emitting device.

FIG. 11 illustrates an embodiment organic light emitting device 2100. The figures are not necessarily drawn to scale. Device 2100 may, for example, include a substrate 2110, an anode 2115, a hole injection layer 2120, a hole transport layer 2125, an electron blocking layer 2130, an emissive layer 2135, a hole blocking layer 2140, an electron transport layer 2145, an electron injection layer 2150, a protective layer 2155, a cathode 2160, and a barrier layer 2170. Cathode 2160 is a compound cathode having a first conductive layer 2162 and a second conductive layer 2164. Device 2100 may be fabricated by depositing the layers described, in order. The properties and functions of these various layers, as well as example materials, are described in more detail in U.S. Pat. No. 7,279,704 at cols. 6-10, which are incorporated by reference.

More examples for each of these layers are available. For example, a flexible and transparent substrate-anode combination is disclosed in U.S. Pat. No. 5,844,363, which is incorporated by reference in its entirety. An example of a p-doped hole transport layer is m-MTDATA doped with F.sub.4-TCNQ at a molar ratio of 50:1, as disclosed in U.S. Patent Application Publication No. 2003/0230980, which is incorporated by reference in its entirety. Examples of emissive and host materials are disclosed in U.S. Pat. No. 6,303,238 to Thompson et al., which is incorporated by reference in its entirety. An example of an n-doped electron transport layer is BPhen doped with Li at a molar ratio of 1:1, as disclosed in U.S. Patent Application Publication No. 2003/0230980, which is incorporated by reference in its entirety. U.S. Pat. Nos. 5,703,436 and 5,707,745, which are incorporated by reference in their entireties, disclose examples of cathodes including compound cathodes having a thin layer of metal such as Mg:Ag with an overlying transparent, electrically-conductive, sputter-deposited ITO layer. The theory and use of blocking layers is described in more detail in U.S. Pat. No. 6,097,147 and U.S. Patent Application Publication No. 2003/0230980, which are incorporated by reference in their entireties. Examples of injection layers are provided in U.S. Patent Application Publication No. 2004/0174116, which is incorporated by reference in its entirety. A description of protective layers may be found in U.S. Patent Application Publication No. 2004/0174116, which is incorporated by reference in its entirety.

Figure 12:
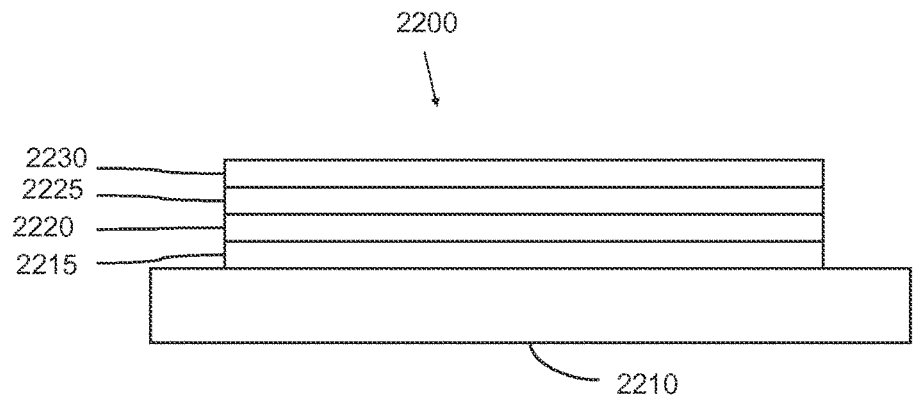
FIG. 12 illustrates schematically an embodiment of an inverted organic light emitting device that does not have a separate electron transport layer.

FIG. 12 illustrates an embodiment of inverted OLED 2200. The device includes a substrate 2210, a cathode 2215, an emissive layer 2220, a hole transport layer 2225, and an anode 2230. Device 2200 may be fabricated by depositing the layers described, in order. Because the most common OLED configuration has a cathode disposed over the anode, and device 2200 has cathode 2215 disposed under anode 2230, device 2200 may be referred to as an "inverted" OLED. Materials similar to those described with respect to device 2100 may be used in the corresponding layers of device 2200. FIG. 12 provides one example of how some layers may be omitted from the structure of device 2100.

The simple layered structure illustrated in FIGS. 11 and 12 is provided by way of non-limiting example, and it is understood that embodiments hereof may be used in connection with a wide variety of other structures. The specific materials and structures described are exemplary in nature, and other materials and structures may be used. Functional OLEDs may be achieved by combining the various layers described in different ways, or layers may be omitted entirely, based on design, performance, and cost factors. Other layers not specifically described may also be included. Materials other than those specifically described may be used. Although various layers may be described as including a single material, it is understood that combinations of materials, such as a mixture of host and dopant, or more generally a mixture, may be used. Also, the layers may have various sublayers. The names given to the various layers herein are not intended to be strictly limiting. For example, in device 2200, hole transport layer 2225 transports holes and injects holes into emissive layer 2220, and may be described as a hole transport layer or a hole injection layer. In one embodiment, an OLED may be described as having an "organic layer" disposed between a cathode and an anode. This organic layer may comprise a single layer, or may further comprise multiple layers of different organic materials as described, for example, with respect to FIGS. 11 and 12. Structures and materials not specifically described may also be used, such as OLEDs comprised of polymeric materials (PLEDs) such as disclosed in U.S. Pat. No. 5,247,190 to Friend et al., which is incorporated by reference in its entirety. By way of further example, OLEDs having a single organic layer may be used. OLEDs may be stacked, for example as described in U.S. Pat. No. 5,707,745 to Forrest et al, which is incorporated by reference in its entirety. OLED structures for user herein may deviate from the simple layered structure illustrated in FIGS. 11 and 12. For example, the substrate may include an angled reflective surface to improve out-coupling, such as a mesa structure as described in U.S. Pat. No. 6,091,195 to Forrest et al., and/or a pit structure as described in U.S. Pat. No. 5,834,893 to Bulovic et al., which are incorporated by reference in their entireties.

Unless otherwise specified, any of the layers of the various embodiments may be deposited by any suitable method. For the organic layers, preferred methods include thermal evaporation, ink-jet, such as described in U.S. Pat. Nos. 6,013,982 and 6,087,196, which are incorporated by reference in their entireties, organic vapor phase deposition (OVPD), such as described in U.S. Pat. No. 6,337,102 to Forrest et al., which is incorporated by reference in its entirety, and deposition by organic vapor jet printing (OVJP), such as described in U.S. patent application Ser. No. 10/233,470, which is incorporated by reference in its entirety. Other suitable deposition methods include spin coating and other solution based processes. Solution based processes are preferably carried out in nitrogen or an inert atmosphere. For the other layers, preferred methods include thermal evaporation. Preferred patterning methods include deposition through a mask, cold welding such as described in U.S. Pat. Nos. 6,294,398 and 6,468,819, which are incorporated by reference in their entireties, and patterning associated with some of the deposition methods such as ink jet and OVJD. Other methods may also be used. The materials to be deposited may be modified to make them compatible with a particular deposition method. For example, substituents such as alkyl and aryl groups, branched or unbranched, and preferably containing at least 3 carbons, may be used in small molecules to enhance their ability to undergo solution processing. Substituents having 20 carbons or more may be used, and 3-20 carbons is a preferred range. Materials with asymmetric structures may have better solution processibility than those having symmetric structures, because asymmetric materials may have a lower tendency to recrystallize. Dendrimer substituents may be used to enhance the ability of small molecules to undergo solution processing.

Devices fabricated in accordance with embodiments hereof may further optionally comprise a barrier layer. One purpose of the barrier layer is to protect the electrodes and organic layers from damaging exposure to harmful species in the environment including moisture, vapor and/or gases, etc. The barrier layer may be deposited over, under or next to a substrate, an electrode, or over any other parts of a device including an edge. The barrier layer may comprise a single layer, or multiple layers. The barrier layer may be formed by various known chemical vapor deposition techniques and may include compositions having a single phase as well as compositions having multiple phases. Any suitable material or combination of materials may be used for the barrier layer. The barrier layer may incorporate an inorganic or an organic compound or both. The preferred barrier layer comprises a mixture of a polymeric material and a non-polymeric material as described in U.S. Pat. No. 7,968,146, PCT Pat. Application Nos. PCT/US2007/023098 and PCT/US2009/042829, which are incorporated herein by reference in their entireties. To be considered a "mixture", the aforesaid polymeric and non-polymeric materials comprising the barrier layer should be deposited under the same reaction conditions and/or at the same time. The weight ratio of polymeric to non-polymeric material may be in the range of 95:5 to 5:95. The polymeric material and the non-polymeric material may be created from the same precursor material. In one example, the mixture of a polymeric material and a non-polymeric material consists essentially of polymeric silicon and inorganic silicon.

Autostereoscopic devices fabricated in accordance with embodiments hereof may be incorporated into a wide variety of consumer products, including flat panel displays, computer monitors, medical monitors, televisions, billboards, heads up displays, fully transparent displays, flexible displays, personal digital assistants (PDAs), laptop computers, micro-displays, vehicles, a large area wall, theater or stadium screen, or a sign. Various control mechanisms may be used to control devices fabricated in accordance with the methods hereof, including passive matrix and active matrix. Many of the devices are intended for use in a temperature range comfortable to humans, such as 18 degrees C. to 30 degrees C., and more preferably at room temperature (20-25 degrees C.), but could be used outside this temperature range (for example, from −40 degrees C. to +80 degrees C.).

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An autostereoscopic display system, comprising:
   a display comprising a plurality of addressable pixels, each of the plurality of pixels comprising two or more sub-pixels;
   a view selector that, for each of two or more viewing perspectives, makes visible one of n views displayed by the display, wherein n is an integer not less than 3; and
   a multiplexer system in operative connection with the display, the multiplexer system controllable to shift light horizontally from at least one of the plurality of pixels;
   wherein a native pixel density of at least one horizontal row of the pixels, divided by n, is greater than 75% of a native pixel density of at least one vertical column of the pixels.

2. The autostereoscopic display system of claim 1 wherein the multiplexer system is controllable to controllably shift light from each of the plurality of pixels as a function of time to provide at least twice the number of views as provided without the multiplexer system.

3. The autostereoscopic display system of claim 2 wherein the multiplexer system comprises one or more lenses, each of which has a refractive index that is variable in response to an input signal thereto, the input signal being variable over time.

4. The autostereoscopic display of claim 3 wherein the one or more lenses of the multiplexer system comprise prisms.

5. The autostereoscopic display of claim 4 wherein the prisms comprise a liquid crystalline material having a refractive index that is variable in response to an electrical signal.

6. The autostereoscopic display system of claim 2 wherein the multiplexer system is controllable to shift light from each the plurality of pixels as a function of time to provide m times as many views as provided without the multiplexer system, wherein m is an integer of at least 2, and a fill factor of each sub-pixel is less than $1/m$.

7. The autostereoscopic display of claim 6 wherein the fill factor of each sub-pixel is caused to be less than $1/m$ by masking.

8. The autostereoscopic display of claim 6 wherein the fill factor of each sub-pixel is caused to be less than $1/m$ by limiting a size of an active area of the sub-pixel.

9. The autostereoscopic display of claim 8 wherein the active area of each sub-pixel is formed via patterning sub-pixel layers to form an OLED device.

10. The autostereoscopic display of claim 9 wherein at least one pixel comprises a red sub-pixel, a green sub-pixel and a blue sub-pixel.

11. The autostereoscopic display of claim 9 wherein at least one pixel comprises at least one white sub-pixel and at least one color filter.

12. The autostereoscopic display of claim 9 wherein at least one pixel includes a first sub-pixel having an emissive region configured to emit blue light, a second sub-pixel having an emissive region configured to emit yellow light and two color filters.

13. The autostereoscopic display of claim 9 wherein at least one pixel comprises a sub-pixel through which light blue light is emitting having a peak wavelength in the visible spectrum of 465-500 nm and a sub-pixel area through which deep blue light is emitted having a peak wavelength in the visible spectrum of 400-465 nm.

14. The autostereoscopic display of claim 9 wherein an emissive region of at least one sub-pixel is larger than the active area of the sub-pixel and the active area is defined by at least one electrode of the sub-pixel.

15. The autostereoscopic display of claim 9 wherein the display is operable in an autostereoscopic mode and in a two-dimensional mode and at least one of the sub-pixels comprises a first active area for which the fill factor is less than 1/m and a second active area, only the first active area emitting light in the autostereoscopic mode, and both the first active area and the second active area emitting light in the two-dimensional mode.

16. The autostereoscopic display system of claim 6 wherein a perceived pixel density of the display in the at least one horizontal row of the pixels divided by n • m is greater than or equal to the pixel density in the at least one vertical column of the pixels.

17. The autostereoscopic display of claim 6 wherein the multiplexer system divides each frame of the native display into m sub-frames.

18. The autostereoscopic display system of claim 1 wherein the view selector comprises a lens system.

19. The autostereoscopic display system of claim 1 wherein the view selector comprises a lenticular lens system, a microlens array system or a parallax barrier system positioned over the display.

20. The autostereoscopic display system of claim 19 wherein a focal length of lenses of the lenticular lens system or the microlens array system is greater than twice a width of the lenses of the lenticular lens system or the microlens array system.

21. The autostereoscopic display system of claim 19 wherein a focal length of lenses of the lenticular lens system or the microlens array system is greater than five times a width of the lenses of the lenticular lens system or the microlens array system.

22. The autostereoscopic display system of claim 19 wherein a focal length of lenses of the lenticular lens system or the microlens array system is greater than ten times a width of the lenses of the lenticular lens system or the microlens array system.

23. The autostereoscopic display system of claim 1 wherein the multiplexer system is controllable to shift light from each of the plurality of pixels as a function of time to provide at least 2n views.

24. The autostereoscopic display system of claim 23 wherein the multiplexer system comprises one or more lenses, each of which has a refractive index that is variable in response to an input signal thereto which is varied over time.

25. The autostereoscopic display of claim 24 wherein the one or more lenses of the multiplexer system comprise prisms.

26. The autostereoscopic display of claim 25 wherein the prisms comprise a liquid crystalline material having a refractive index that is variable in response to an electrical signal.

27. The autostereoscopic display system of claim 23 wherein the multiplexer system is controllable to shift light from each of the plurality of pixels as a function of time to provide m times n views, wherein m is an integer of at least 2, and a fill factor of each sub-pixel is less than 1/m.

28. The autostereoscopic display of claim 27 wherein the fill factor of each sub-pixel is caused to be less than 1/m by masking.

29. The autostereoscopic display system of claim 27 wherein the fill factor of each sub-pixel is caused to be less than 1/m by limiting the size of an active area of the sub-pixel.

30. The autostereoscopic display of claim 29 wherein the active area of each sub-pixel is formed via patterning sub-pixel layers to form an OLED device.

31. The autostereoscopic display of claim 30 wherein at least one pixel comprises a red sub-pixel, a green sub-pixel and a blue sub-pixel.

32. The autostereoscopic display of claim 30 wherein at least one pixel comprises at least one white sub-pixel and at least one color filter.

33. The autostereoscopic display of claim 30 wherein at least one pixel includes a first sub-pixel having an emissive region configured to emit blue light, a second sub-pixel having an emissive region configured to emit yellow light and two color filters.

34. The autostereoscopic display of claim 30 wherein at least one pixel comprises a sub-pixel through which light blue light is emitted having a peak wavelength in the visible spectrum of 465-500nm and a sub-pixel area through which deep blue light is emitted having a peak wavelength in the visible spectrum of 400-465nm.

35. The autostereoscopic display of claim 30 wherein an emissive region of at least one sub-pixel is larger than the active area of the sub-pixel and the active area is defined by at least one electrode of the sub-pixel.

36. The autostereoscopic display of claim 30 wherein the display is operable in an autostereoscopic mode and in a two-dimensional mode and at least one of the sub-pixels comprises a first active area for which the fill factor is less than 1/m and a second active area, only the first active area emitting light in the autostereoscopic mode, and both the first active area and the second active area emitting light in the two-dimensional mode.

37. The autostereoscopic display system of claim 27 wherein a perceived pixel density of the display in the at least one horizontal row of the pixels divided by n • m is greater than or equal to the pixel density in the at least one vertical column of the pixels.

38. The autostereoscopic display of claim 1 wherein each of the two or more sub-pixels of the plurality of pixels comprises an organic light emitting device.

39. The autostereoscopic display of claim 1 wherein each of the two or more sub-pixels of the plurality of pixels comprises a light emitting diode.

40. The autostereoscopic display of claim 1 wherein each of the two or more sub-pixels of the plurality of pixels comprises a liquid crystal.

41. The autostereoscopic display of claim 1 wherein the multiplexer system optically coupled to the display is electrically synchronized with the display.

42. The autostereoscopic display of claim 1 wherein the multiplexer system is controllable to shift light from each of the plurality of pixels as a function of time to provide m times n views, wherein m is an integer of at least 2, and wherein the multiplexer system divides each native frame of the display into m sub-frames.

43. The autostereoscopic display of claim 1 wherein the native pixel density of the at least one horizontal row of pixels divided by n is greater than or equal to the native pixel density of the at least one vertical column of pixels.

44. The autostereoscopic display system of claim 1, wherein n is an integer not less than 4.

45. The autostereoscopic display system of claim 1, wherein n is an integer not less than 9.

46. The autostereoscopic display system of claim 1, wherein the at least one horizontal row of pixels comprises sub-pixels of multiple colors.

* * * * *